April 12, 1938.     J. C. OLSEN     2,113,855
BELT FASTENER
Filed Aug. 24, 1936
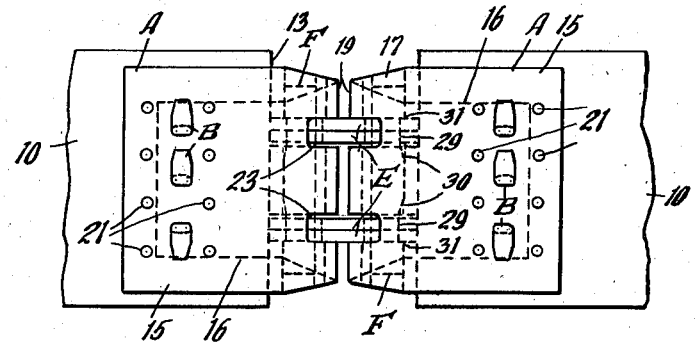
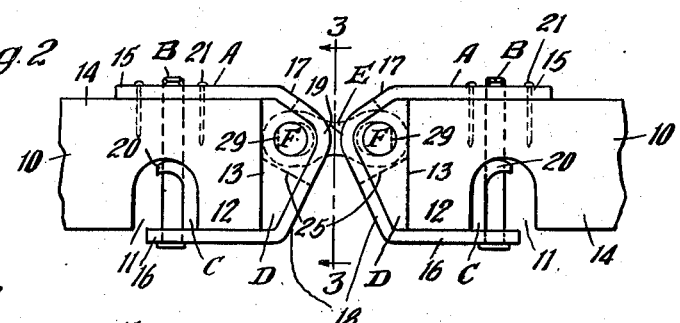
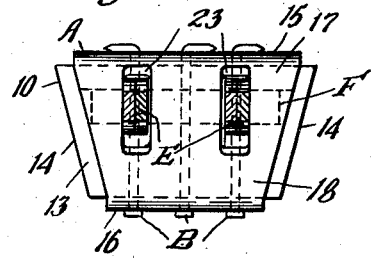
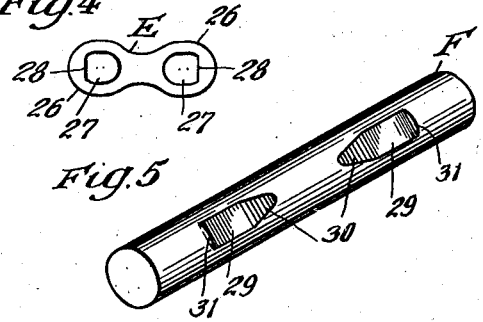
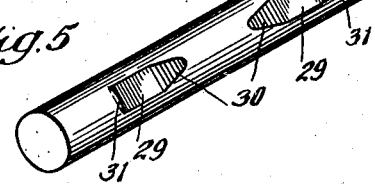
Inventor
John C. Olsen
By Joseph Harris
his Atty.

Patented Apr. 12, 1938

2,113,855

UNITED STATES PATENT OFFICE 2,113,855

BELT FASTENER

John C. Olsen, Chicago, Ill., assignor to Flexible Steel Lacing Company, Chicago, Ill., a corporation of Illinois Application August 24, 1936, Serial No. 97,623

6 Claims. (Cl. 24—33)

This invention relates to improvements in belt fasteners and more particularly, but not exclusively, flexible fasteners of the bail type used in connecting the ends of a side-driving or V-belt.

Much difficulty has heretofore been experienced in the belt fastener art in the use of all types of so-called hinged or flexible fasteners employing bails or bail-like attaching members for the belt ends. The difficulties experienced are due to the tendency of the bights of the bail parts to crystallize rapidly and then break. Said crystallization is caused by the constant rapid "whipping" action induced in the jointed belt ends as the joint in the belt continuously passes from the tangent onto the pulley and off of the pulley back again to the tangent. When the belt is moving rapidly, as the advance belt end reaches the pulley and is then diverted from its tangent line of motion, the attaching member carried by said advance belt end is suddenly snapped outwardly with respect to the following or rear belt end, thus causing a sudden snapping or clicking action between the attaching member and the pivot pin connection with the link or other flexible jointing member. There is thus imparted to the fastening members a sharp blow which is continuously repeated on both attaching members as the belt travels around on the pulleys and in time sets up the crystallization which causes the ultimate breaking.

One object of the present invention is to provide a flexible fastener of the bail type such that destructive crystallization of the bails or bail-like members is either entirely eliminated or at least minimized to thereby insure longer life of the fastener while in service.

Another object of the invention is to provide a belt fastener of the bail and link type wherein the pivotal or rocking connections between the links and the bail attaching members are effected through means of combined bearing and filler members snugly retained within the bights of the bails in such manner as to eliminate or minimize any striking or blow effects that would otherwise be occasioned by the usual whipping action of the belt while in rapid motion.

Other objects of the invention will more clearly appear from the description and claims hereinafter following.

In the drawing forming a part of this specification, Figure 1 is a top plan view of a fastener showing one embodiment of the improvements as applied to a relatively wide V or side-driving belt. Figure 2 is a side elevation of the structure shown in Figure 1. Figure 3 is a transverse or radial sectional view corresponding to the section line 3—3 of Figure 2. Figure 4 is a detail elevational view of one of the links employed and Figure 5 is a detail perspective, upon an enlarged scale, of one of the pivot pins employed.

In said drawing, the adjacent ends of the V-belt are indicated at 10—10, the belt shown being of that type having alternated lug and recess formation on its inner side, the endmost recesses being indicated at 11 and the endmost lugs at 12. In preparing the belt ends for the fastener, the belt ends are cut off square as indicated at 13 so as to provide a full depth flat face, as best shown in Figure 2. The driving faces of the belt are those indicated at 14 as will be understood.

In carrying out the invention, the fastener preferably comprises two attaching members A—A, one for each end of the belt; a plurality of securing pins or elements B—B; a backing plate C associated with each member A; combined bearing and filler members D—D; connector links E—E; and pivot pins F—F. The attaching members A—A are of like construction and each comprises an outer arm 15, an inner arm 16 and a bight portion of preferably uneven substantially V-formation of which the upper side of the V-formation is indicated at 17 and the lower or inner side thereof at 18, the rounded apex being indicated at 19.

The two arms 15 and 16 extend parallel and embrace the inner and outer faces of the belt, as shown, the outer arm 15 of the bail member being preferably wider than the arm 16 and the bight portion being tapered to conform thereto, as shown in Figure 3. All portions of each attaching member A are made as wide as practicable, dependent upon the size of the belt to which applied, but sufficiently narrow transversely of the belt so as to suitably clear the side driving faces 14 and thus prevent possibility of metal contact with the grooves of the pulleys.

To secure each member A to its belt end, the upper arm 15 is extended rearwardly preferably beyond the line of the end recess 11 and the lower or inner arm 16 is extended partially over the recess 11. The arms 15 and 16 are provided with suitably alined perforations to receive a plurality of securing pins, three being shown in the form illustrated, said pins B extending radially through the arms 15 and 16, the recess 11 and the main body or load-transmitting part of the belt, as best indicated in Figure 2. Interposed between each set of securing pins B, the endmost lug 12 and inner arm 16 of the member A, is a bearing plate C conformed to the shape of the recess 11 and preferably notched in its curved flange 20 to receive the pins B and thus retain the plate C in place. Additional brads 21—21 may be employed to further strengthen the attachment to the belt end. For a more complete description of the manner of securing the attaching member to the notched type of belt, reference may be had to my copending application No. 15,951, filed April 12, 1935 for improvement in belt fastener.

Referring now more particularly to the flexible connections between the attaching members A, the bight portions, as hereinbefore stated, are preferably of unequal V formation, the object of which is to bring the apices 19 thereof substantially in line with the neutral axis or zone of the V-belt, that is, in line with the main load-transmitting portion of the belt which is generally approximately two-thirds the distance from the outer surface of the belt to the bottoms of the recesses 11. It will also be noted that the arms 15 and 16 of each attaching member are continued straight for a short distance beyond the flat end 13 of the belt. Each bight portion is provided with one or more apertures 23—23, dependent upon the number of links E which are to be employed in the fastener and through which the ends of the links are entered to effect the connection, as hereinafter described. Said apertures 23 are made of sufficient extent vertically, as shown in Figure 3, to allow of the necessary maximum pivotal action of the links.

Each combined filler and bearing member D, preferably made of bronze or other suitable bearing material, is of such size and shape as to completely fill the space defined between the flat end 13 of the belt and the extended bight portion of the attaching member A, as clearly shown in Figure 2. In transverse extent, each member D will be the same as that of the bight portion of the attaching member A with its ends conformed to the taper of the bight portion. With this construction, the members D not only snugly fill the space within the bight portions, but provide a solid and complete metal to metal backing for the bight portions without any possibility of a striking or hammering action occurring between the members D and the bail attaching members A and thus preventing or minimizing the crystallizing action hereinbefore referred to. It will also be understood that the members D are always automatically pressed snugly against the members A since the belts are of resilient material and, in applying the fastener, the belt material will be somewhat compressed so as to insure the outward pressure from the belt material to the members D.

Each combined filler and bearing member D is transversely apertured as indicated at 24 to provide a journal bearing for one of the pivot pins F and to allow for insertion and removal of the pin to effect the link connection, as hereinafter described. In addition, each member D is recessed as indicated at 25—25 corresponding to the number of links employed and located in line with the apertures 23 of the attaching members, as will be understood. Said recesses 25 are suitably flared so as to allow of the necessary pivotal action of the links.

In the construction illustrated, two links E—E are employed, spaced transversely of the belt, although the number thereof may obviously be decreased or increased to suit different sizes of belts. As shown, each link E preferably comprises two plate-like elements of suitable thickness to adapt the same for mass production in the form of stampings. The links are of the general outline best illustrated in Figure 4 with enlarged ends 26—26 and openings 27 in each end, each said opening 27 having a flat face 28 nearest the corresponding end of the link, for the purpose hereinafter described. The openings 27 are elongated lengthwise of the link to an extent somewhat greater than the diameter of the pins F so as to facilitate assembly as hereinafter described.

Each pin F, as best illustrated in Figure 5, is of cylindrical form throughout the greater part of its length, but intermediate its ends, is cut back so as to provide flat bearing faces 29—29, one for each link. At their inner ends, the flat bearing faces 29 are merged into the cylindrical surface of the pin, by beveled surfaces 30 and, at the opposite ends thereof, abutments or shoulders 31—31 are formed as shown.

After the attaching members A and members D have been applied to the belt ends, the connection is effected as follows. The links E are inserted in one of the members A and the corresponding pin F then inserted through the member D and openings 27 of the links. During this action, the links will be pushed inwardly sufficiently for the flat bearing faces 28 thereof to clear the shoulders 31 of the pin F and, when the flat bearing faces 29 of the pin become positioned opposite the flat bearing faces 28 of the links, the latter are then released so as to engage with the flat faces 29 of the pin and thus form a non-rocking engagement with the pin. The same procedure is employed in connecting the opposite ends of the links with the other belt end, as will be understood. As clear from Figure 2, the axes of the pins F are in line with the apices of the attaching members A and hence in line with the neutral axis of the belt, to thus insure maximum efficiency in transmitting the pulling loads.

With the construction assembled as shown and described it is evident that the pivotal movement of the links relative to the attaching members A is accompanied by a corresponding rotating movement of the pins F in the bearing members D and that there is no play or lost motion between either the links and the pins F or between the pins F and the bearing members D or, as previously described, between the bearing members D and the attaching members A, thus eliminating the sharp blows heretofore an incident of flexible bail type fasteners. To disassemble the fastener, it is obvious that by pushing the links inwardly so as to clear the shoulders 31 of the pins, the latter can be removed. In this connection, it will be observed that the inclined surfaces 30 of the pin are extended in opposite directions so that, whichever way the pin F is removed, only one of the shoulders 31 at a time needs to be cleared from a link, thus facilitating the removal of the pins.

Although there has been shown and described what is now considered the preferred manner of carrying out the invention, the same is by way of illustration only and not by way of limitation since, as will be obvious to those skilled in the art, various changes and modifications may be made without departing from the spirit of the invention. All changes and modifications

What is claimed is:

1. In a fastener for the ends of a belt, the combination with a pair of bail-like attaching members each having the bight thereof apertured; of means for securing said members to the respective ends of the belt with the bights spaced from the belt ends; a solid, metal combined bearing and filler member disposed within the bight portion of each of said attaching members and shaped to fill the space between the bight and the corresponding belt end; a link having its ends extending through said apertures and within the bearing members, the latter being also recessed to receive the link ends and allow angular movement of the link relative thereto; and means movably connecting the link and bearing members and having bearing in said bearing members.

2. In a fastener for the ends of a V-belt, the combination with a pair of bail-like attaching members each having a plurality of apertures in the bight thereof; means for securing said members to the belt ends; a combined bearing and filler member disposed within the bight portion of each of said attaching members and shaped to occupy the entire space between the bight and corresponding belt end, said bearing members being provided with a plurality of recesses alined with the apertures of the attaching members; a plurality of links having their ends extending through said apertures and within the recesses of the bearing members; and means movably connecting said links with the bearing members.

3. In a fastener for the ends of a V belt, the combination with a pair of bail members each having the bight thereof apertured; of means for securing said members to the belt ends; a metal combined bearing and filler member for each attaching member, each said bearing member having a transverse journal bearing therethrough and recessed in line with the aperture of the bail member; a pivot pin journaled in each said bearing member, each pivot pin having a flat bearing face; and a link extending through said apertures and within said recesses, the link ends having flat engaging faces cooperable with said flat faces of the pivot pins.

4. In a fastener for the ends of a V belt, the combination with a pair of bail attaching members each having a bight of unequal approximately V formation and with the apices so located as to be positioned in line with the neutral axis of the belt, said bights being apertured; of combined bearing and filler members disposed within the bights of the attaching members and conformed to the V formation of the bights; a link having its ends extended through said apertures; and means pivotally connecting the ends of said link with said bearing members, the axes of the pivotal connections being substantially in line with the apices of the bights.

5. In a fastener for the ends of a V belt, the combination with a pair of bail attaching members each having arms adapted to embrace the end of a belt and provided with an intermediate bight portion of generally V formation disposed beyond the ends of the belt, the bights each having a plurality of apertures therein; means for attaching the members to the belt ends; a combined filler and bearing member disposed within the bight portion of each attaching member and completely occupying the space between the belt end and bight portion, each said bearing member being provided with a transversely extending journal bearing and having also a plurality of recesses alined with said apertures; a plurality of links extending between the attaching members and through said apertures; a pivot pin pivotally connecting the links with each bearing member, the pins being journaled in said bearing members; and means providing a non-rockable shouldered engagement between said links and pivot pins.

6. In a fastener for the ends of a belt, the combination with a pair of bail-like attaching members each having the bight thereof apertured; of means for securing said members to the respective ends of the belt with the bights of said members spaced from the ends of the belt; a one piece solid metal bearing filler member disposed within the bight of each of said attaching members, said bearing filler member having a journal bearing extending transversely therethrough and provided also with a laterally extending recess on the side adjacent the bight and in line with the aperture thereof; a link having its ends entered through the bight apertures and within said recesses of the bearing filler members; and journal pins mounted in the bearing filler members to pivotally connect the links thereto.

JOHN C. OLSEN.